United States Patent [19]
Henderson

[11] 3,946,359
[45] Mar. 23, 1976

[54] MOTOR VEHICLE SAFETY AND/OR WARNING DEVICES

[76] Inventor: Henning Morgan Henderson, Flat 708 Monarch Mansions, 36 Twist St., Joubert Park, Johannesburg, Transvaal Province, South Africa

[22] Filed: Aug. 28, 1974

[21] Appl. No.: 501,232

[30] Foreign Application Priority Data
May 13, 1974 South Africa.................. 74/3034

[52] U.S. Cl............ 340/52 H; 340/262; 200/61.45 R
[51] Int. Cl.²........................................ B60Q 1/44
[58] Field of Search............ 340/52 R, 52 H, 62, 65, 340/66, 262, 263; 200/61.45 R, 61.47, 61.52

[56] References Cited
UNITED STATES PATENTS

| | | |
|---|---|---|
| 2,890,443 | 6/1959 | Folberth ............................ 340/262 |
| 3,030,477 | 4/1962 | Hensley ...................... 200/61.47 X |
| 3,538,496 | 11/1970 | Bumpous ........................ 340/262 X |

*Primary Examiner*—Alvin H. Waring
*Attorney, Agent, or Firm*—Stevens, Davis, Miller & Mosher

[57] ABSTRACT

A device for fitment to a motor vehicle and adapted to close a circuit upon excessive accelerative, decelerative or centrifugal forces being applied thereto, the circuit including means for preventing the closure thereof from being registered for a predetermined length of time in order to avoid registration of such closure as a result of bumps or the like in a road, the registration of closure being effected by a counter and/or audible alarm.

11 Claims, 3 Drawing Figures

MOTOR VEHICLE SAFETY AND/OR WARNING DEVICES

This invention relates to safety and/or warning devices for use on motor vehicles and which are adapted to warn drivers or record information as to accelerating and/or decelerating at excessive rates and/or as to cornering at excessively high speeds.

The need for such a device is due to the inability of many motorists to control a vehicle in high speed turns particularly on slippery and loose road surfaces and in fact to judge when a cornering speed is excessive. The device coupled with means for recording the number of times over a period when cornering has been effected at excessive speeds with consequent unnecessary tyre wear, is also useful as a check on drivers employed by commercial firms.

When a vehicle corners a lateral thrust is developed due to centrifugal force, the lateral thrust on the vehicle being dependent on speed, radius of turn and degree of banking of the road. A device of the above type utilises this lateral thrust as a means to operate a device indicative of whether a cornering speed is excessive or not.

Since the device is responsive to a lateral thrust it may also be located to be responsive to a fore and aft thrust, thus indicating excessive accelleration and braking. Alternatively the responsive elements of the device may be duplicated and located so as to be responsive to both lateral and fore and aft thrust.

Such a device has been described in my South African Pat. No. 66/6673 wherein mercury tubes were employed to effect switching of an alarm and/or activation of a counter according to whether or not the vehicle velocity changed sufficiently to cause switching.

However, in the device described in my said Patent the possibility exists that a sudden jolt such as when a vehicle passes through a pot-hole could cause switching by momentary contact of mercury which splashes onto the contacts in the tube.

It is accordingly the object of this invention to provide an improved device of this type wherein the described disadvantage is overcome.

According to this invention there is provided a device adapted to be fitted to a vehicle for indicating certain forces applied thereto comprising one or more switching members adapted to be closed during the application of accelerative decellerative and/or centrifugal forces above certain values thereto, and a circuit embodying a counter and/or warning emitter, the device being characterised in that the circuit is arranged such that the counter and/or warning emitter is activated only after a switching member has been closed for a predetermined time period.

Further features of the invention provide for there to be four switching members, one for each direction of turn of a vehicle, one for acceleration and one for deceleration; for the switching members to be inclined capsules containing fluent electrically conducting material or alternatively a conductive element such as a ball or roller, or alternatively for the switching members to be operative on a pendulum principle, and for the said predetermined time period to be less than 2 seconds and preferably between 0.1 and 0.5 of a second.

A still further feature of the invention provides for the circuit to embody a further time delay arrangement adapted to prevent activation of the warning emitter or counter for a predetermined time period after opening of a switching member which has been closed. Preferably this latter time period is of the order of 3 to 5 seconds.

In order that the invention may be more fully understood one embodiment thereof will now be described by way of example. In this description reference is made to the accompanying drawings in which.

Figure 1:
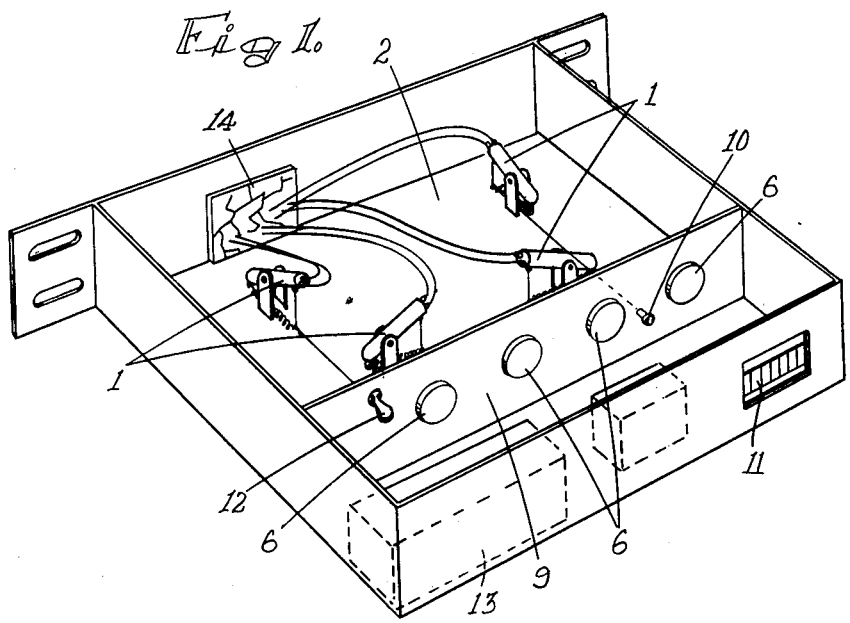
FIG. 1 is a top isometric view of a complete unit.
Figure 2:
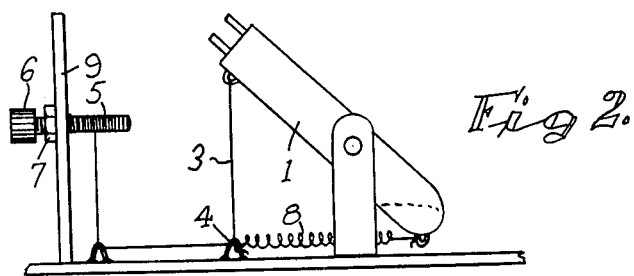
FIG. 2 is a diagrammatic elevation illustrating the sensitivity adjustment means of the unit.

In this embodiment of the invention the device is adapted to warn a driver and count the number of warnings in respect of excessive acceleration, deceleration and cornering speeds in each direction. Thus the device is provided with four inclined glass capsules 1 two of which are located parallel in plan view to the length of the box 2 in which they are supported and are inclined upwardly in opposite directions in the vertical plane. The other two capsules are located at right angles to the first mentioned two in plan view and also are inclined upwardly in opposite directions in the vertical plane. Thus, in use the box is located such that two capsules extend parallel to the length of the vehicle in plan view and the other two are located transversely to the vehicle length. The former two are for acceleration and deceleration and the latter two are for the two cornering directions.

Each capsule contains a suitable amount of fluent conducting material which is preferably mercury and has a pair of contacts at its upper end which can be closed by mercury should it be forced sufficiently far up the capsule. Also, these capsules are preferably coated with a suitable plastics material in order to render them unbreakable.

The capsules are pivotally mounted and their inclination is adjustable by means of a flexible filament 3 attached to the top of each capsule and passing through suitable eyelets 4 and onto a rotatable spindle 5. The latter is fitted with a knurled knob 6 and locking-nut 7 to enable the filament to be locked in the desired position. In order to hold the capsule in position the lower end of each is biased downwardly by means of a spring 8. The four knurled knobs are located in a transverse partition wall 9 in the box which will also support a test button 10 connected simply to operate the audible alarm and counter 11 described below.

Figure 3:
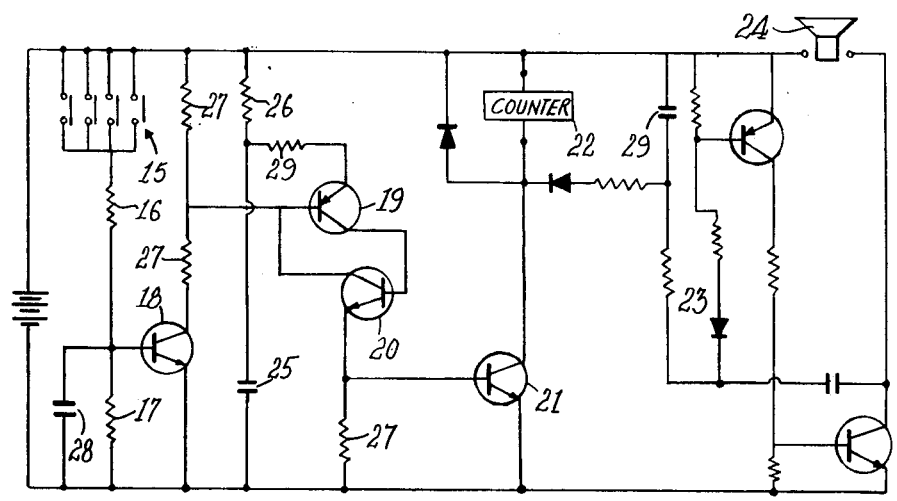
FIG. 3 is a circuit diagram embodying the present invention.

A main power switch 12 is mounted on the partition wall to isolate the power supply pack which is in the form of a battery 13 from the circuit which is contained in a printed circuit board 14 within the box. All the contacts from the capsules are also connected to the printed circuit board and the remainder of the function of the circuit will be described with reference to FIG. 3.

The circuit embodies the four capsules represented as switches 15 all connected in parallel to the positive of the power supply and connected by way of two series arranged voltage dividing resistors 16 and 17 to the negative of the power supply.

A first capacitor 28 is connected between negative and the opposite end of the one voltage dividing resistor 17 such that it is to be charged through the other resistor 16. The capacitor is also connected to the base of an npn transistor 18 which is arranged to fire a pnp transistor 19 when it is conducting. The latter is arranged to fire an npn protective transistor 20 which in turn fires a power transistor 21. The latter operates a counter 22 and oscillator circuit 23 which powers an audible speaker unit 24.

The emitter of the pnp transistor 19 is connected through a second capacitor 25 to negative and the latter is arranged to be charged through a resistor 26 from the positive. The usual voltage dividing resistors 27 are embodied in the circuit in a manner apparent to those skilled in the art.

The arrangement and values of the components are chosen such that the first capacitor must charge to a predetermined level upon closure of one of the mercury switches before the first transistor 18 is fired. The time taken for this is preferably between 0.2 and 0.3 seconds such that if a switch is momentarily closed by a splash of mercury the counter and audible alarm will not be activated.

This first transistor will only fire the pnp transistor if the second capacitor 25 is charged and the time taken to effect charging of this capacitor is preferably about 4 seconds. This prevents the counter and audible alarm from being activated more frequently than every four seconds. The principle behind this is to prevent a plurality of driving "faults" from being registered whilst a first fault is still in the process of being corrected.

Finally the oscillator circuit is arranged to be powered by discharge of an operating capacitor 29 such that the audible alarm only operates for about a second thereby preventing an irritating or disturbing noise from continuing for an undesirable length of time.

It will be appreciated that the device described above will operate only upon detection of a fault as opposed to splashing of the mercury for example and will thus obviate, at least to some extent the disadvantages outlined above.

The invention applies equally well to capsules containing metal elements such as a ball or to pendulum type of switches.

What I claim as new and desire to secure by Letters Patent is:

1. Apparatus for indicating excessive accelerative, decelerative and centrifugal forces acting on a moving vehicle, comprising:
    at least one switch means;
    means mounting said switch means on a base member for movement from an open to a closed position upon application of an excessive inertial force to said base member; and
    circuit means coupled to said switch means for indicating and recording when said switch means is in the closed position, said circuit means including time delay means for delaying the activation of said circuit means to indicate and record said closed position until said switch means has remained closed for a period of time from about 0.1 to about 0.5 second.

2. The apparatus according to claim 1, wherein said switch means comprises four switching members each mounted to said base for movement from open to closed positions upon application of a respective force due to acceleration, deceleration, left vehicle turn and right vehicle turn.

3. A device as claimed in claim 1 in which the switching members are inclined capsules containing fluent electrically conducting material.

4. A device as claimed in claim 3 in which the inclination of the capsules is adjustable.

5. A device as claimed in claim 1 in which the switching members are inclined capsules containing a movable conductive element.

6. A device as claimed in claim 5 in which the inclination of the capsules is adjustable.

7. The apparatus according to claim 1, further comprising: second time delay means for preventing activation of said recording and indicating means for a second predetermined period of time after said switch means has moved from said closed position to said open position.

8. The apparatus according to claim 7, wherein said second predetermined period of time is between approximately 3 and 5 seconds.

9. The apparatus according to claim 7, further comprising: counter means for counting a first closing of said switch means only after the first time delay has expired and for counting a subsequent closing of said switch means only after said second time delay has expired.

10. The apparatus according to claim 7, further comprising an audible alarm triggered into operation a first time upon a first closing of said switch means only after the first time delay has expired and into operation a second time upon a subsequent closing of said switch means only after said second time delay has expired.

11. The apparatus according to claim 10, further comprising means to shut off said alarm after a third predetermined time delay.

* * * * *